US007318271B2

(12) United States Patent

Yamanashi et al.

(10) Patent No.: US 7,318,271 B2

(45) Date of Patent: Jan. 15, 2008

(54) DEVICE FOR ASSEMBLING CONNECTOR

(75) Inventors: Makoto Yamanashi, Shizuoka (JP); Shogo Suzuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/519,051

(22) Filed: Sep. 12, 2006

(65) Prior Publication Data

US 2007/0006449 A1 Jan. 11, 2007

Related U.S. Application Data

(62) Division of application No. 10/140,061, filed on May 8, 2002, now Pat. No. 7,124,506.

(30) Foreign Application Priority Data

May 16, 2001 (JP) ............................ 2001-146900

(51) Int. Cl.
*B23P 19/00* (2006.01)

(52) U.S. Cl. ............................ 29/748; 29/745; 29/747; 29/749; 439/310

(58) Field of Classification Search .......... 29/745-750, 29/760, 235, 758, 426.6, 876, 884; 439/66, 439/594-595, 752
See application file for complete search history.

(56) References Cited

U.S. PATENT DOCUMENTS

| | | | | |
|---|---|---|---|---|
| 3,455,006 | A * | 7/1969 | Ullman et al. | 29/566 |
| 3,997,956 | A * | 12/1976 | McKee | 29/564.1 |
| 4,048,710 | A * | 9/1977 | Nijman | 29/566.4 |
| 5,187,862 | A | 2/1993 | Ohsumi | 29/764 |
| 5,820,411 | A | 10/1998 | Okabe | 439/595 |
| 5,839,921 | A | 11/1998 | Yamanashi | 439/595 |
| 5,930,892 | A * | 8/1999 | Kato et al. | 29/861 |
| 5,984,705 | A | 11/1999 | Miyazaki et al. | 439/304 |
| 6,050,860 | A | 4/2000 | Tsuchiya | 439/748 |
| 6,165,011 | A | 12/2000 | Fukuda | 439/595 |
| 6,634,096 | B1 * | 10/2003 | Yamamoto et al. | 29/764 |
| 6,655,993 | B1 | 12/2003 | Yamamoto | 439/595 |
| 6,953,358 | B2 | 10/2005 | Ichida et al. | 439/304 |
| 7,124,506 | B2 * | 10/2006 | Yamanashi et al. | 29/876 |
| 2002/0173204 | A1 | 11/2002 | Yamanashi et al. | 439/752 |

FOREIGN PATENT DOCUMENTS

| | | |
|---|---|---|
| JP | 6-58570 | 8/1994 |
| JP | 11-354185 | 12/1999 |

* cited by examiner

*Primary Examiner*—Minh Trinh
(74) *Attorney, Agent, or Firm*—Kratz, Quintos & Hanson, LLP

(57) ABSTRACT

A process and device for assembling a connector is provided, by which the production efficiency can be improved by preventing the problem of insertion error from occurring in a step of terminal insertion into a connector housing in the manufacturing process of the wiring harness by using an automatic assembly machine or in a step of the operation by the human hands. The process includes the steps of: provisionally locking the spacer in the connector housing; inserting a jig rod into the connector housing before inserting the terminal into the connector housing, the jig rod being for releasing the locking of the spacer which is completely locked in the connector housing; pulling the jig rod out from the connector housing; and inserting the terminal into the connector housing.

2 Claims, 7 Drawing Sheets

DEVICE FOR ASSEMBLING CONNECTOR

CROSS REFERENCE TO RELATED APPLICATION

This application is a divisional application of U.S. application Ser. No. 10/140,061, filed May 8, 2002 now U.S. Pat. No. 7,124,506, and claims the right of priority under 35 U.S.C.§119 based on Japanese Patent Application No. 2001-146900 filed on May 16, 2001, which is hereby incorporated by reference herein in its entirety as if fully set forth herein.

BACKGROUND OF THE INVENTION (1) Field of the Invention

The present invention relates to a process and device for assembling a connector, by which a terminal is securely fixed in a connector housing no matter whether a spacer is provisionally or completely mounted in the connector housing.

(2) Description of the Related Art

Each of FIGS. 10 and 11 is a longitudinal cross sectional view illustrating an example of a conventional assembly of a double locking connector.

The double locking connector 1 includes a connector housing 10, spacer 20 and female terminal 30 with these parts being assembled therein.

The connector housing 10 is formed with circumferential walls 11 and includes a spacer receiving chamber 12, spacer insertion opening 12, terminal receiving chamber 13, rear opening 13*d* and terminal insertion opening 14. The same reference numeral 12 is used for the spacer receiving chamber 12 and spacer insertion opening 12 for convenience. The terminal receiving chamber 13 is formed being surrounded by a partition wall 13*a* continuing to a locking lance 15, rear horizontal partition wall 13*b*, and rear vertical partition wall 13*c*.

A member 18 for complete locking, i.e. projection 18 for complete locking, which engages with a member 28 for complete locking of the spacer 20, is formed at the spacer insertion opening 12 of the circumferential wall 11. A member 19 for provisional locking, i.e. a projection 19 for provisional locking, which engages with a member 29 for provisional locking of the spacer 20, is formed in the spacer receiving chamber 12 of the connector housing 10.

The locking lance 15 tentatively locks the female terminal 30 in the terminal receiving chamber 13 and is formed integrally with the partition wall 13*a* of the connector housing 10. The terminal insertion opening 14 is provided with a tapered guide surface 14*a* in order that a tab (not shown) of a male terminal in a mating connector can be easily inserted into the interior of the connector housing 10 passing through the terminal insertion opening 14.

The spacer 20 is provided in the connector 1 so as to completely lock and fix the terminal 30 in the terminal receiving chamber 13.

With the spacer 20 provided in the connector housing 10 as described above, in the connector in which the terminal 30 is assembled into the connector housing 10, such an accident can be prevented from occurring that a cable 40 connected to the rear of the terminal 30 is abruptly pulled and accordingly the terminal 30 mounted in the terminal receiving chamber 13 by the lance 15 is pulled off from the rear opening 13*d* of the connector housing 10 and as a result the terminal 30 is separated from the connector housing, because the terminal 30 is doubly locked in the connector housing 10 by the spacer 20.

The spacer 20 includes a terminal-passing portion 21 formed being surrounded by an inclined wall 22*a* and vertical partition wall 22*b*, operation portion 26, and locking piece 27.

The operation portion 26 is provided so that the spacer 20 can be easily locked in the connector housing 10 provisionally or completely by the operation portion being pressed.

The operation portion 26 is provided also for a purpose that the spacer 20 locked completely in the connector housing 10 can be easily released therefrom by using an appropriate jig when the spacer 20 completely locked in the connector housing 10 should be returned to a provisional locking state thereof.

A pair of the locking pieces 27 is formed at right and left of the width direction of the body of the spacer 20. The locking piece 27 is provided with the member 29 for provisional locking, i.e. a projection 29 for provisional locking, which engages with the member 19 for provisional locking provided in the spacer receiving chamber 12 of the connector housing 10. The member 29 for provisional locking includes a space 29*a* having an inverse U-shape for the projection 29 for provisional locking to bend easily. The operation portion 26 is provided with the member 28 for complete locking, i.e. the projection 28 for complete locking, which engages with the member 18 for complete locking provided at the spacer insertion opening 12.

The female terminal 30 includes an electric contact part 33 and wire connection part 34. The electric contact part 33 is formed in a rectangular box-shape being surrounded by circumferential walls and the interior thereof is provided with an elastic contact piece and contact. The wire connection part 34 includes a conductive crimp contact piece and coated crimp contact piece. A wire 40 such as a cable 40 consisting of an insulating coating 42 and a conductor 41 protected by the insulating coating 42 is connected to the rear side of the female terminal 30 (see FIG. 4). The conductor 41 of the cable 40 is caulked by the conductive crimp contact piece of the female terminal 30 while the insulating coating 42 of the cable 40 is caulked by the coated crimp contact piece of the female terminal 30, thereby the female terminal 30 is electro-conductively connected to the cable 40.

As shown in FIG. 10, the female terminal 30 is inserted into the terminal receiving chamber 13 from the rear opening 13*d* of the connector housing 10 and fixed in the connector housing 10. At that time, the spacer 20 is held being stopped at a provisional locking position in the connector housing 10. The connector housing 10, in which the spacer 20 is mounted in such a provisional locking state, is carried with being collected per a specific batch and being received in a special container such as a pallet.

However, in the conventional assembly process of the connector 1, even if the spacer 20 is held in a provisional locking state in the connector housing 10, when the connector housings 10 each of which includes such a spacer 20 are carried with being collected per a specific batch and being received in a special container such as a pallet, the spacer 20 may accidentally be locked completely in the connector housing 10 by oscillation and the like during conveying.

In the event that the spacer 20 is accidentally locked completely in the connector housing 10 and such a connector housing 10 including the spacer 20 is set in an automatic assembly machine and then the female terminal 30 is about to be inserted into the terminal receiving chamber 13 of such a connector housing 10, as shown in FIG. 11, a front end 32 of the female terminal 30 hits against a rear end 25 of the inclined wall 22a of the spacer 20, which is completely locked in the connector housing 10, resulting in that the female terminal 30 cannot be inserted into the terminal receiving chamber 13.

When such a problem takes place in the automatic assembly machine, which manufactures a wiring harness, the machine detects the abnormality and halts its operation, causing a deterioration in the production efficiency. When such a problem frequently takes place in a flow process manufacturing line provided with the automatic assembly machines, every such a time the operation of the automatic assembly machine is halted by the detection of abnormality, causing a severe deterioration in the production efficiency.

In order to avoid such a deterioration in the production efficiency, an operator has to carry out a total inspection for the connector housing 10 including the spacer 20 therein so as to check whether or not the spacer 20 is accidentally completely locked in the connector housing 10, which is carried with being collected per a specific batch and being received in a special container such as a pallet.

Further, the operator has to carry out an operation to recover a provisional locking state of the spacer 20 in the connector housing 10 for every connector housing 10, in which the spacer 20 is accidentally completely locked in the connector housing 10.

Many operators are required to carry out such a total inspection of the connector housing 10 in order to deal with the problem described above. Meanwhile, the deterioration in the production efficiency in the flow process manufacturing line must be avoided. Such a severe condition means a difficult problem in the manufacturing line, therefore a measure to solve the problem has eagerly been desired.

SUMMARY OF THE INVENTION

It is therefore an objective of the present invention to solve the above problem and to provide a process and device for assembling a connector, by which the production efficiency can be improved by preventing the problem of insertion error as described above from occurring in a step of the terminal insertion into the connector housing in the manufacturing process of the wiring harness by using an automatic assembly machine or in a step of the operation by the human hands.

In order to attain the above objective, the present invention is to provide a process for assembling a connector, in which a spacer is provisionally locked in a connector housing and thereafter a terminal is completely locked in the connector housing, the process comprising the steps of:

provisionally locking the spacer in the connector housing;

inserting a jig rod into the connector housing before inserting the terminal into the connector housing, the jig rod being for releasing the locking of the spacer which is completely locked in the connector housing;

pulling the jig rod out from the connector housing; and inserting the terminal into the connector housing.

With the construction described above, even if the spacer is accidentally completely locked in the connector housing before the terminal is inserted into the connector housing, the spacer can easily quickly restores the provisional locking state again. Thereby, the insertion performance of the terminal into the connector housing can be improved.

The spacer is in advance mounted in the connector housing before the insertion of the terminal. It has not been secured that the spacer is always provisionally locked in the connector housing. However, with the construction according to the present invention, no matter whether the spacer is provisionally or completely mounted in the connector housing, the spacer is securely set in the provisional locking state thereof only by inserting the jig rod into the connector housing. Therefore, the terminal can be securely fixed in a connector housing without interfering with the spacer.

Preferably, an inclined guide surface is formed at an end of the jig rod having a straight shape, the jig rod is inserted from a rear opening of a terminal receiving chamber of the connector housing, the jig rod is advanced while the inclined guide surface abuts against a rear end of the spacer which is mounted in the connector housing, and the inclined guide surface comes in slidable contact with an inclined wall of the spacer, so that the locking state of the spacer in the connector housing is changed from the complete locking to the provisional locking.

With the construction described above, since the inclined guide surface is formed at the end of the jig rod, when the jig rod is inserted from the rear opening of the terminal receiving chamber of the connector housing and the inclined guide surface abuts against the rear end of the spacer which is mounted in the connector housing, the jig rod smoothly comes into slidable contact with the inclined wall of the spacer so as to press the spacer. Therefore, the spacer which has been completely locked in the connector housing is securely released from the complete locking state thereof and the spacer smoothly restores the provisional locking state thereof in the connector housing.

Preferably, an optional portion between front and rear ends of the inclined guide surface formed at the end of the jig rod abuts against a corner, at which an inclined surface and rear end surface of the spacer intersect each other.

With the construction described above, the spacer which has been completely locked in the connector housing is more securely released from the complete locking state thereof and the spacer more smoothly restores the provisional locking state thereof in the connector housing.

Further, the present invention is to provide a device for assembling a connector comprising:

a first chuck for holding a connector housing including a spacer so as to move the connector housing to a specific position;

a base on which the connector housing including the spacer is placed;

a jig rod reachable up to the interior of a terminal receiving chamber of the connector housing, for changing a locking state of the spacer in the connector housing from complete locking to provisional locking; and a second chuck for holding a terminal so as to insert the terminal in the terminal receiving chamber of the connector housing.

With the construction described above, if the device for assembling a connector according to the present invention is used as an automatic assembly machine, a problem that the terminal, spacer or connector housing may be damaged in the event that the terminal is accidentally inserted into the connector housing in which the spacer is completely locked can be prevented from occurring, thereby the deterioration in the yield of the terminal, spacer or connector can be prevented from occurring.

Above all, when a terminal to which a wire such as a cable and wiring harness is already connected is deformed or damaged, components in connection with the connector together with the other components such as a cable and so on connected to the terminal have to be assembled with each other again from the beginning. To the contrary, with the device for assembling a connector according to the present invention described above, the terminal is not deformed or damaged, thereby the yield of each of the various components is significantly improved. When the device for assembling a connector according to the present invention is used as the automatic assembly machine, a series of the operations described above can be carried out by using such an automatic assembly machine, thereby the productivity for manufacturing a connector can be significantly improved.

Preferably, an inclined guide surface is formed at an end of the jig rod and the inclined guide surface abuts against a corner, at which an inclined surface and rear end surface of the spacer intersect each other.

With the construction described above, since the inclined guide surface is formed at the end of the jig rod, therefore the spacer which has been completely locked in the connector housing is securely released from the complete locking state thereof and the spacer smoothly restores the provisional locking state thereof in the connector housing.

DESCRIPTION OF THE PREFERRED EMBODIMENTS

Figures 1A, 1B, 1C:
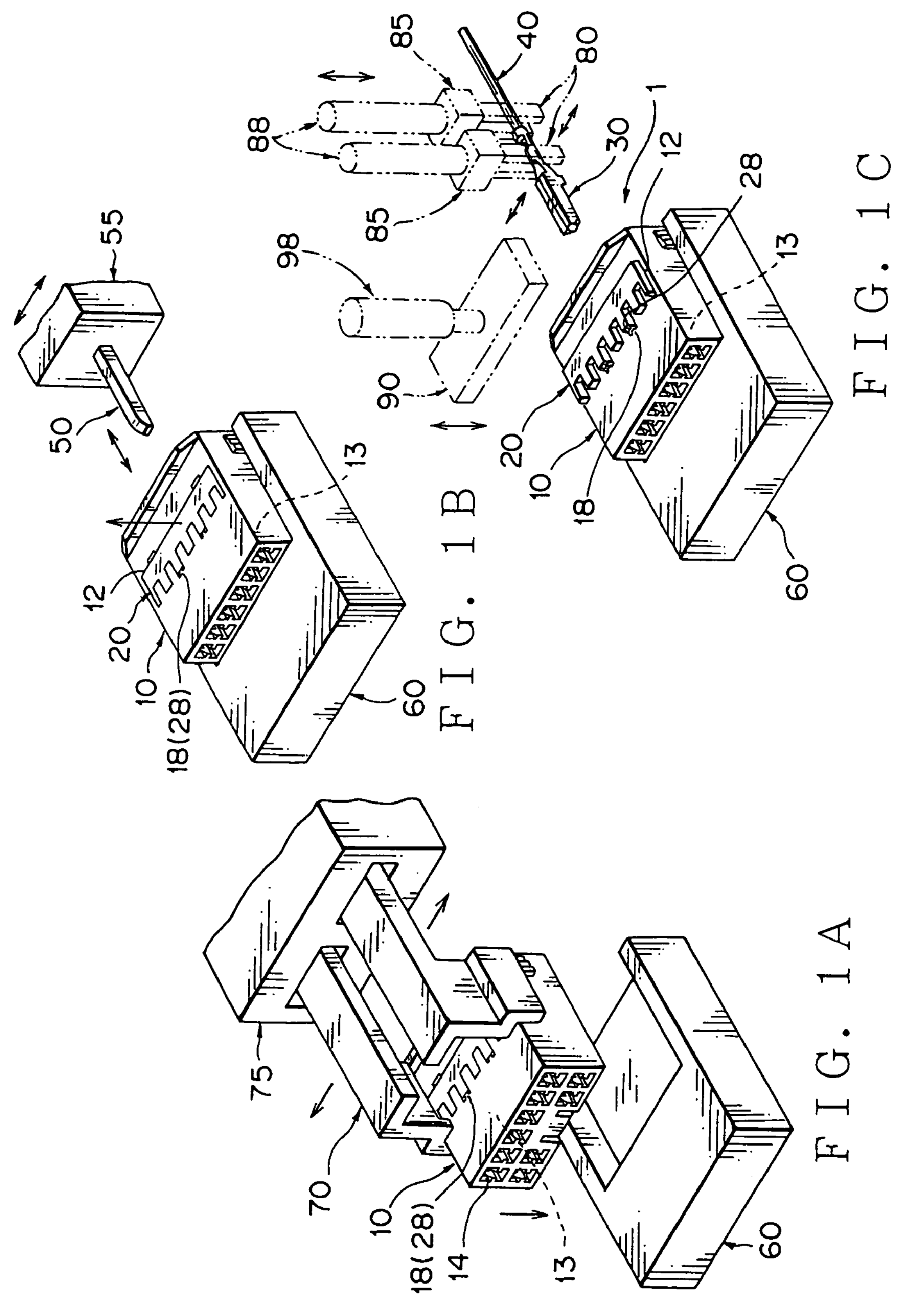
FIG. 1A is a perspective view illustrating a preferred embodiment of a process and device for assembling a connector according to the present invention, in which a connector housing is placed on a base.
FIG. 1B is a perspective view illustrating a preferred embodiment of a process and device for assembling a connector according to the present invention, in which a jig rod is inserted into a connector housing.
FIG. 1C is a perspective view illustrating a preferred embodiment of a process and device for assembling a connector according to the present invention, in which a terminal is inserted into a connector housing.

In the following, a preferred embodiment of a process and device for assembling a connector according to the present invention will be explained in detail with reference to the attached drawings. The same reference numeral, which is used in the explanation of the prior art described above, is used for a component or part in the preferred embodiment if such a component or part corresponds to one in the prior art in its name, and the detailed explanation for them is omitted.

Figure 3:
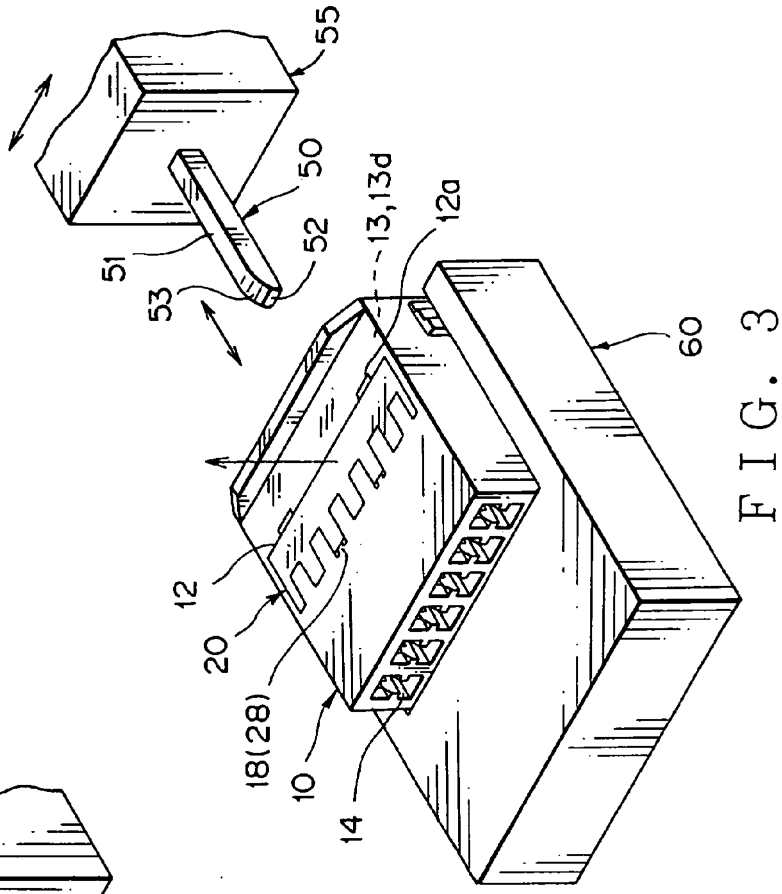
FIG. 3 is a perspective view illustrating a preferred embodiment of a process and device for assembling a connector according to the present invention.
Figure 2:
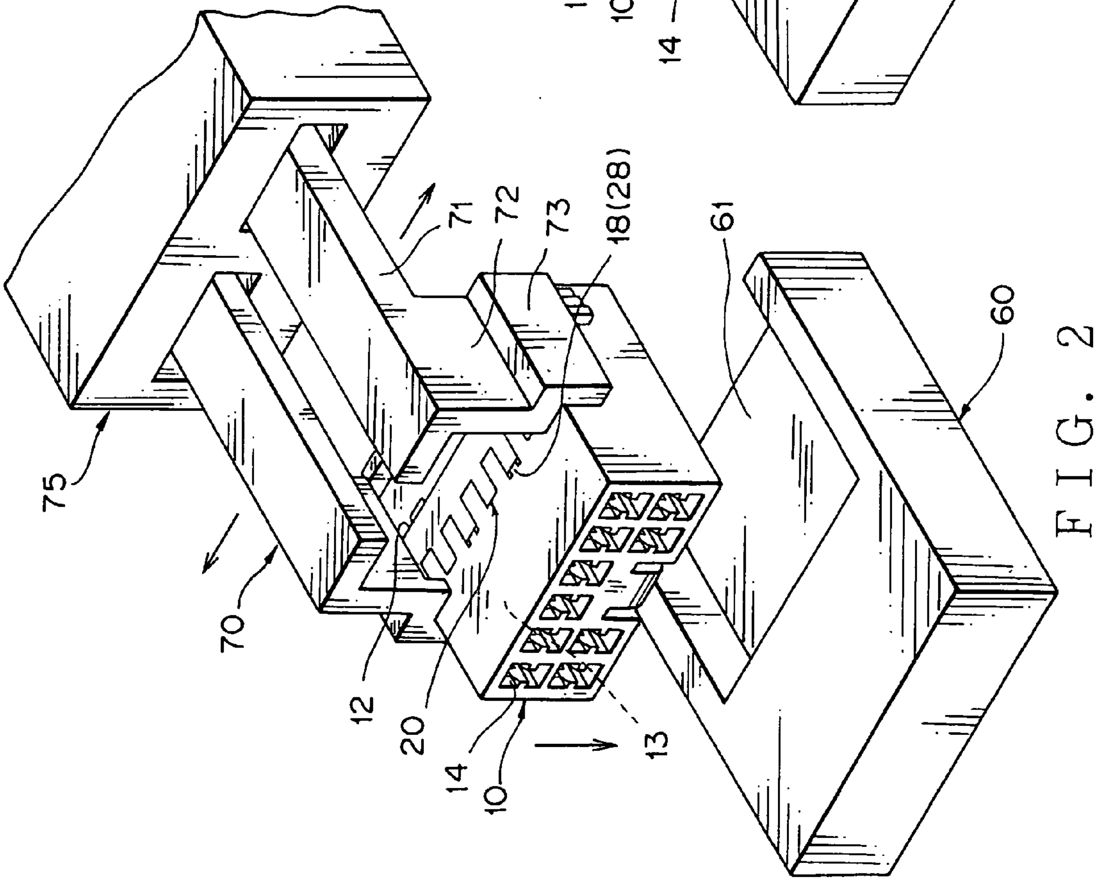
FIG. 2 is a perspective view illustrating a preferred embodiment of a process and device for assembling a connector according to the present invention.
Figure 4:
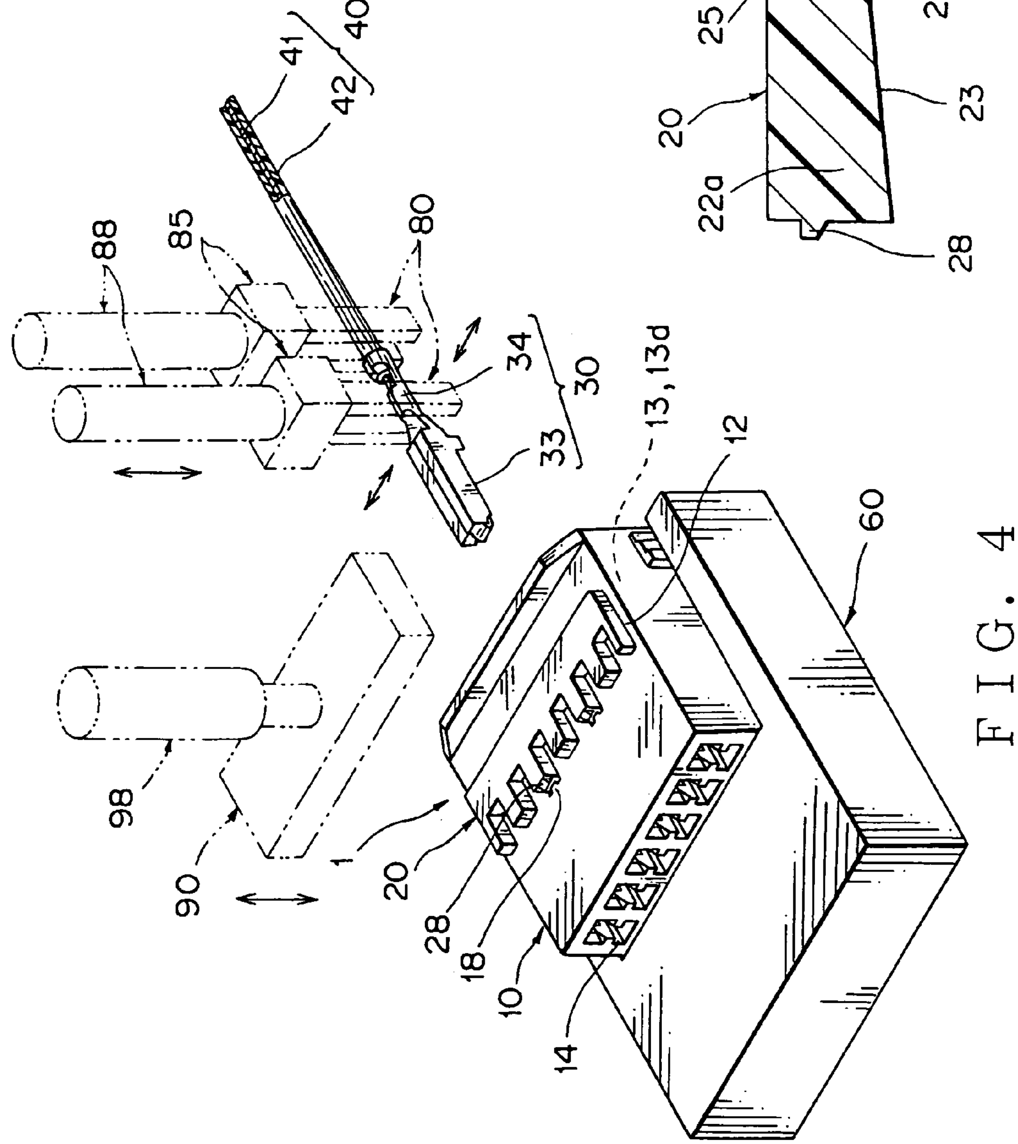
FIG. 4 is a perspective view illustrating a preferred embodiment of a process and device for assembling a connector according to the present invention.

FIG. 1A is a perspective view illustrating a preferred embodiment of a process and device for assembling a connector according to the present invention, in which a connector housing is placed on a base. FIG. 1B is a perspective view illustrating a preferred embodiment of a process and device for assembling a connector according to the present invention, in which a jig rod is inserted into a connector housing. FIG. 1C is a perspective view illustrating a preferred embodiment of a process and device for assembling a connector according to the present invention, in which a terminal is inserted into a connector housing. Each of FIGS. 2-4 is a perspective view illustrating a preferred embodiment of a process and device for assembling a connector according to the present invention.

Figure 9:
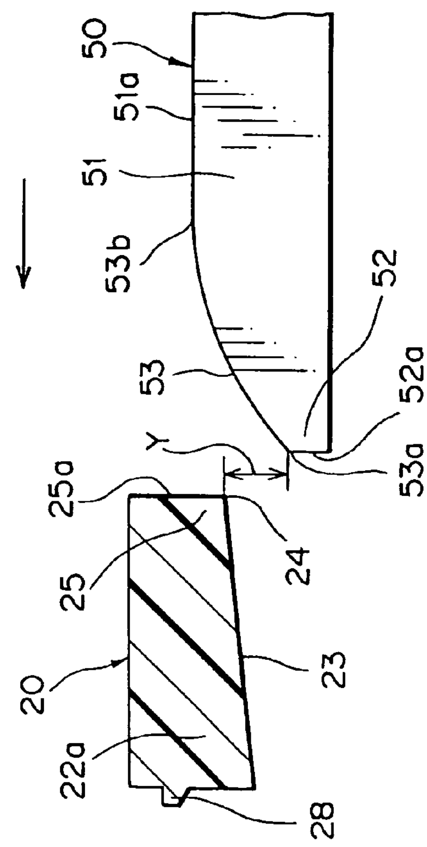
FIG. 9 is an enlarged view illustrating a primary part of a process and device for assembling a connector according to the present invention.
Figure 5A:
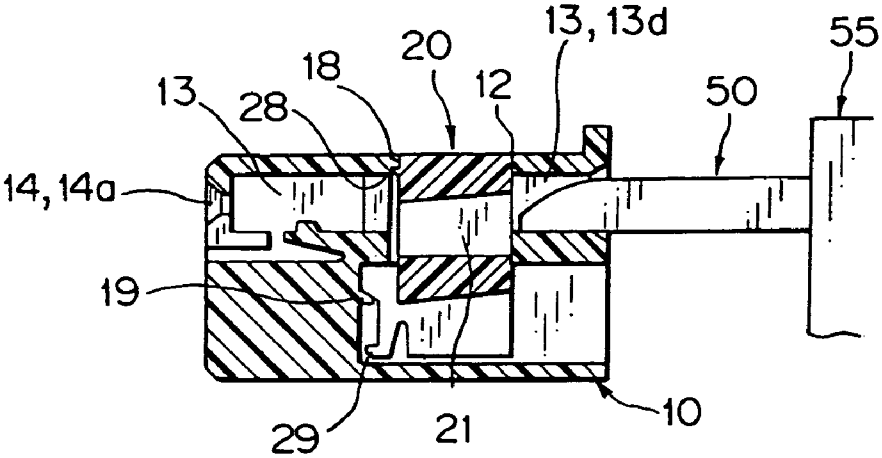
FIG. 5A is a longitudinal cross sectional view illustrating a preferred embodiment of a process for assembling a connector according to the present invention, in which a jig rod is inserted into the rear side of a connector housing.
Figure 5B:
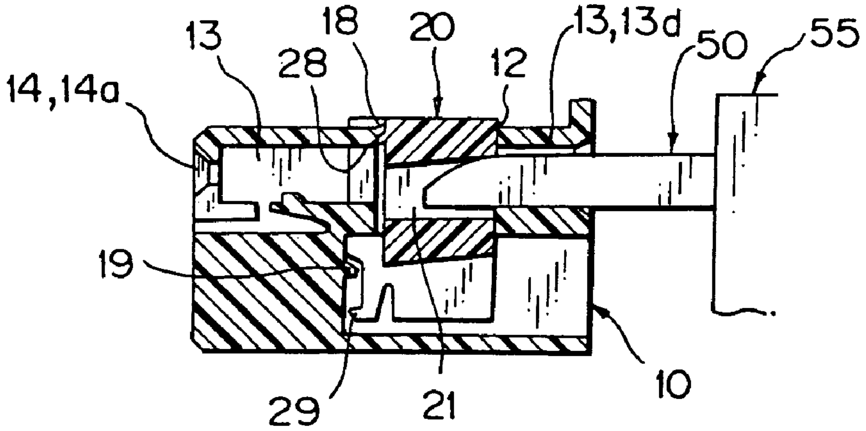
FIG. 5B is a longitudinal cross sectional view illustrating a preferred embodiment of a process for assembling a connector according to the present invention, in which a jig rod is inserted halfway in a connector housing.
Figure 5C:
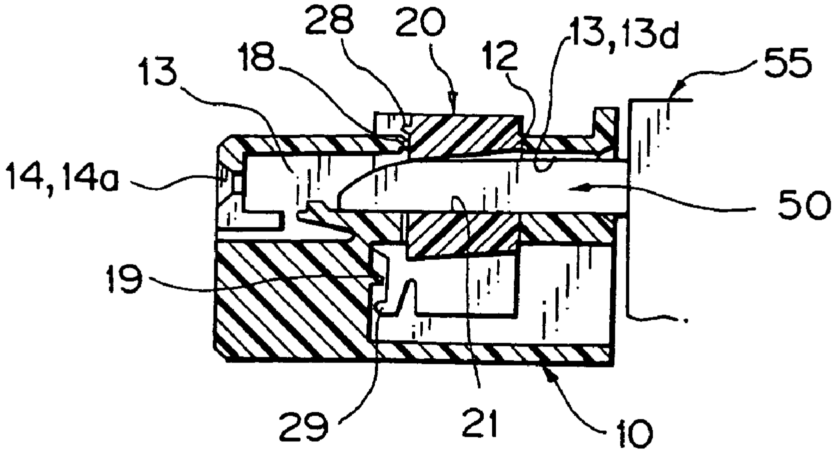
FIG. 5C is a longitudinal cross sectional view illustrating a preferred embodiment of a process for assembling a connector according to the present invention, in which a jig rod is inserted into the depth of a connector housing.
Figure 6:
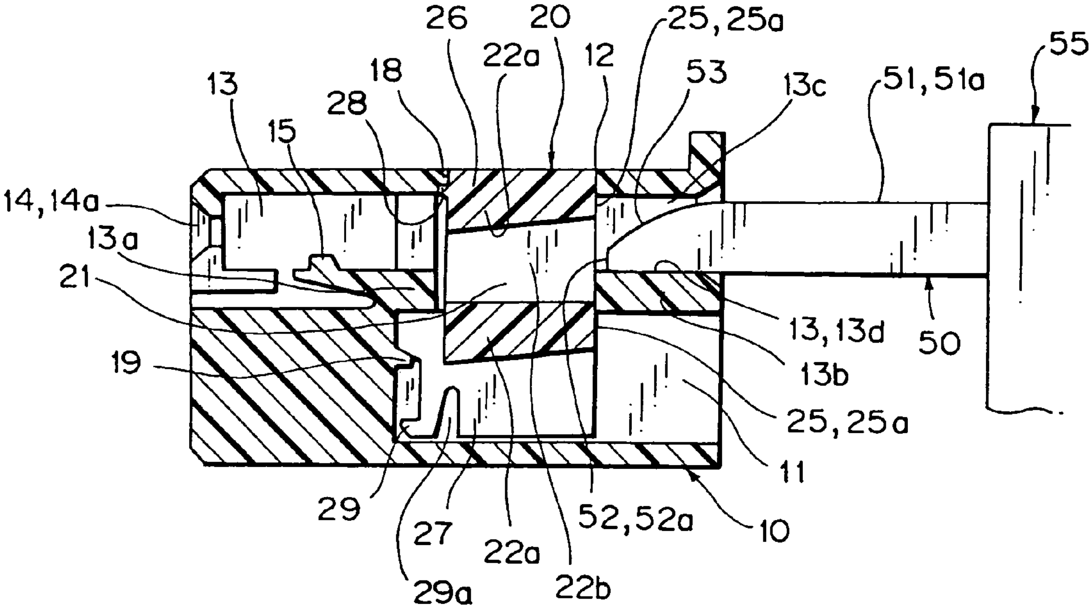
FIG. 6 is a longitudinal cross sectional view illustrating a preferred embodiment of a process for assembling a connector according to the present invention.
Figure 7:
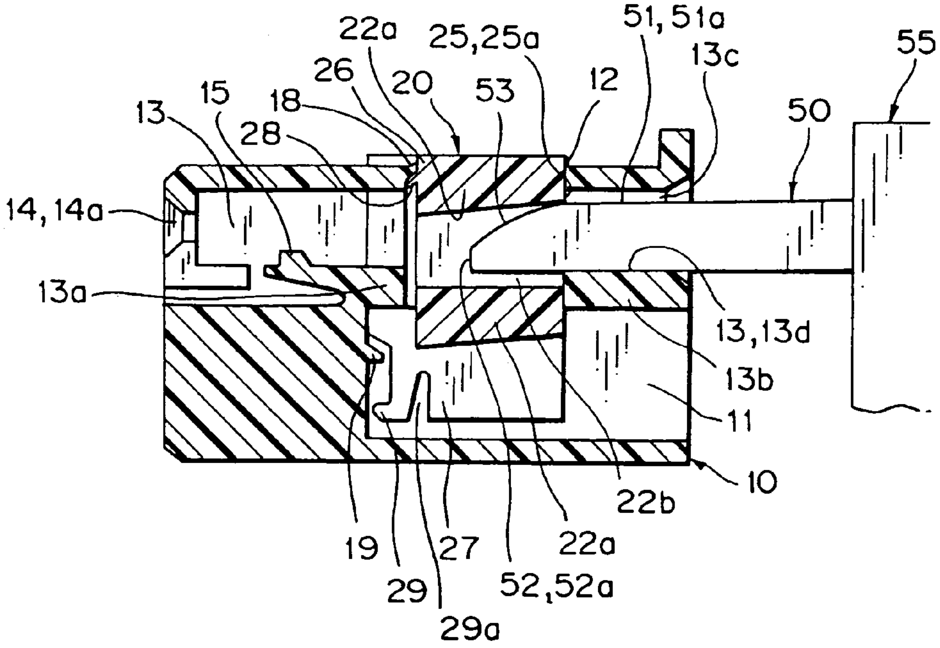
FIG. 7 is a longitudinal cross sectional view illustrating a preferred embodiment of a process for assembling a connector according to the present invention.
Figure 8:
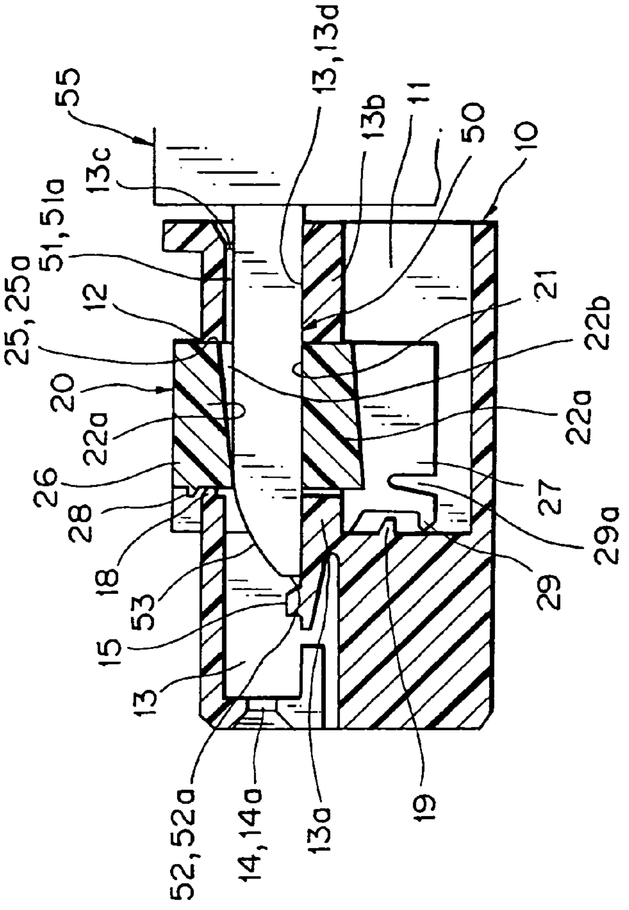
FIG. 8 is a longitudinal cross sectional view illustrating a preferred embodiment of a process for assembling a connector according to the present invention.
Figure 11:
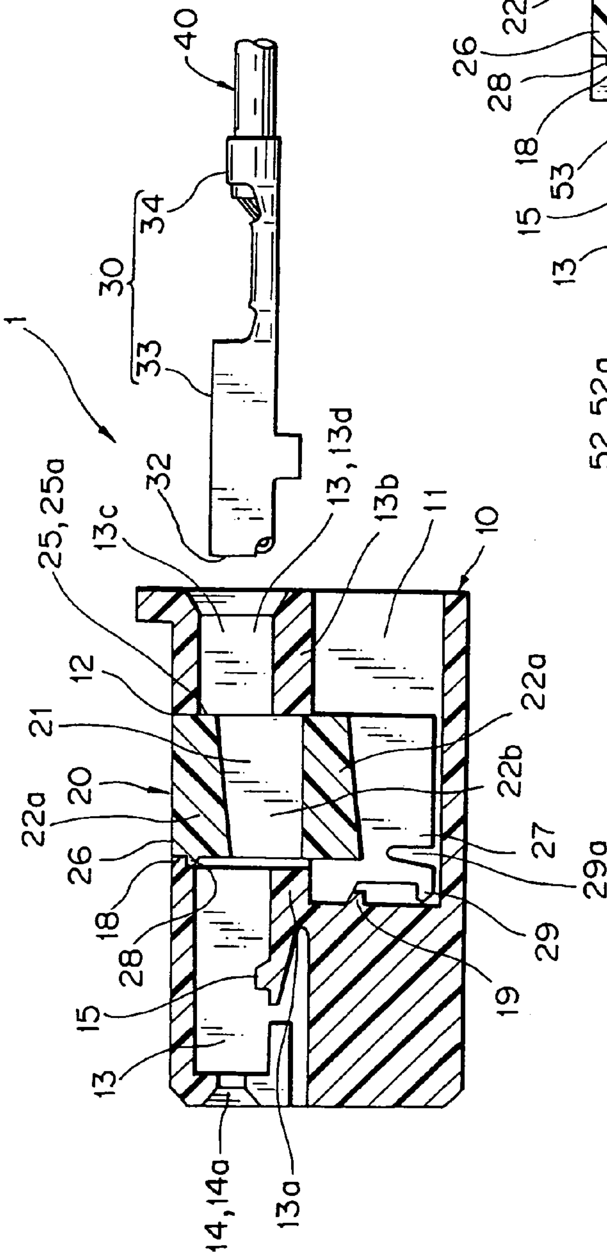
PRIOR ART FIG. 11
FIG. 11 is a longitudinal cross sectional view illustrating an example of a conventional assembly of a double locking connector.
Figure 10:
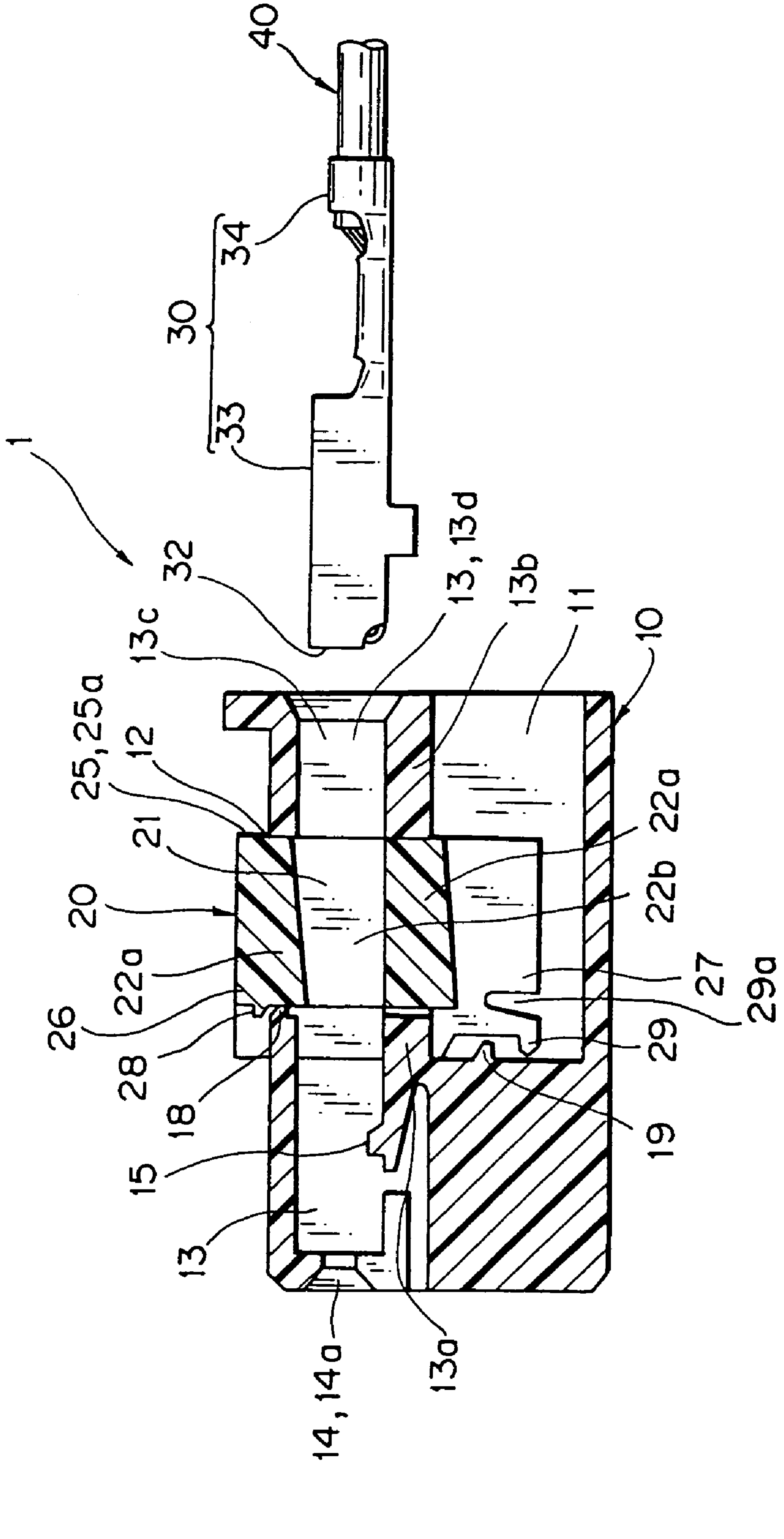
PRIOR ART FIG. 10
FIG. 10 is a longitudinal cross sectional view illustrating an example of a conventional assembly of a double locking connector.

FIG. 5A is a longitudinal cross sectional view illustrating a preferred embodiment of a process for assembling a connector according to the present invention, in which a jig rod is inserted into the rear side of a connector housing. FIG. 5B is a longitudinal cross sectional view illustrating a preferred embodiment of a process for assembling a connector according to the present invention, in which a jig rod is inserted halfway in a connector housing. FIG. 5C is a longitudinal cross sectional view illustrating a preferred embodiment of a process for assembling a connector according to the present invention, in which a jig rod is inserted into the depth of a connector housing. Each of FIGS. 6-8 is a longitudinal cross sectional view illustrating a preferred embodiment of a process for assembling a connector according to the present invention. FIG. 9 is an enlarged view illustrating a primary part of a process and device for assembling a connector according to the present invention.

In the following, each direction for a connector will be explained.

As for a definition of upper and lower sides (or top and bottom), in FIGS. 1-8, the upper side is the side at which a spacer receiving chamber 12 of a connector 1 or connector housing 10 is formed while the opposite side to the upper side is defined as the lower side. Therefore, the upper and lower (or top and bottom) direction in this specification means the height direction of the connector housing 10 placed horizontally, which is shown in FIGS. 5-8.

As for a definition of front and rear sides, in FIGS. 1-8, the front side is the side of a terminal insertion opening 14, that is, the engaging side of the connector 1 or the connector housing 10 while the opposite side to the front side is defined as the rear side. As for a definition of front view and rear view, the front view is to see the connector 1 from the engaging side of the connector 1 or the connector housing 10 while the rear view is to see the connector 1 from the terminal insertion side, that is, from the wire connection side.

A definition of right and left sides is determined as a logical consequence according to the definition of the upper and lower sides (or top and bottom) and the front and rear sides. The right and left direction in this specification means the width direction of the connector 1 or connector housing 10 placed horizontally.

The above definition of the upper and lower sides, front and rear sides, and right and left sides is for convenience and not necessarily agree with a practical direction upon the use of the connector.

In this specification, the connector means a component for a purpose of electric connection including a connector housing, spacer and part for electric connection such as a terminal. The connector may further include a sealing member such as a seal, rubber stopper and waterproof stopper for improving the waterproof characteristic. The connector may include an additional part such as a front holder and rear holder. A connector, in which the terminal is connected to a wire, or a connector which can be welded may be used as well.

In this specification, the terminal is either a female terminal or a male terminal. The female terminal receives the male terminal to carry out an electric connection mating with the male terminal. The female terminal may include an elastic contact piece such as a spring for generating a contact load. The female terminal 30 (see FIGS. 1C and 4) used in the preferred embodiment has a rectangular box-shape corresponding to the tab-type male terminal having a flat plate-shape and has an elastic contact piece therein. Besides such a female terminal having a rectangular box-shape, a female terminal having a rectangular cylinder-shape or round cylinder-shape corresponding to a male terminal of square pin-type or round pin-type may be used. Any type of female terminal can be employed for the present invention.

As for a process for producing the female terminal 30 shown in FIGS. 1C and 4, first a metal plate is subjected to die cutting to make a terminal fittings material and thereafter the material is subjected to bending, thereby a female terminal 30 having a specific shape. Thus, a wire connection part 34 and electric contact part 33 are formed in the female terminal 30.

An electric contact part of the male terminal enters in the female terminal so as to carry out an electric connection. As for a busbar including a tab, an electric contact part of the busbar enters into the female terminal so as to function as a male terminal for electric connection. A male terminal has a shape such as a tab type, square pin type and round pin type-shape. The male terminal used in the present invention may have any shape such as a round pin type and square pin type shape besides one having a tab type-shape of a flat plate-shape.

The terminal such as the female terminal 30, male terminal and busbar may be made of copper-based material such as bronze, brass and copper alloy or aluminum alloy. The terminal such as the female terminal 30, male terminal and busbar may be made of any material provided that the material is a metal having electrical conductivity or a conductor having heat resistance upon welding.

In this specification, the wire may be a conductor protected by an insulating coating or enamel, or a conductor without such a protective coating. The cable is also called as a core wire. As shown in FIG. 4, the cable 40 includes one conductor 41 or plurality of conductors 41 protected by an insulating coating 42 or enamel.

The insulating coating 42 may be made of, for example, soft resin or rubber. The wiring harness mainly includes the cable 40 consisting of the conductor 41 and insulating coating 42, a tape for binding the cables 40, connector, and grommet and is bent at the portion required so as to be mounted on a motor vehicle.

Consequently, preferably the conductor 41 is made of material having not only the electrical conductivity but also flexibility so as to resist against repeated bending, such as a copper-based wire such as an annealed copper wire. In the cable 40, a plurality of conductors 41 are bound and moderately twisted so as to improve the mechanical strength thereof. A conductor coated by enamel may be employed as the wire such as the cable.

Preferably, the insulating coating 42 is also made of electrically insulating material having flexibility so as to resist against repeated bending such as a thermoplastic resin such as chloroethylene-based polymer and polyethylene-based polymer, soft resin, rubber and the mixture thereof. A filler may be added to the insulating material as the need arises.

When the insulating coating is extrusion molded, for example, the conductor such as a copper wire is inserted into an extrusion hole of a mold together with the insulating coating, thereby the insulating coating 42 and the conductor 41 is combined, so that the wire 40 such as the cable 40 is constructed.

The locking lance is simply called as a lance and two types, i.e., housing lance-type and terminal lance-type. The shape of the locking lance may be various shapes such as a lance-shape, arm-shape and so on.

In the housing lance-type, a lance for locking a terminal consisting of an arm made of, for example, plastic is integrally formed in a terminal receiving chamber (i.e. terminal holding cavity) of the connector housing so as to lock the terminal. The plastic arm means a terminal locking lance 15 (see FIGS. 6-8), which is integrally formed in the terminal receiving chamber of the connector housing.

On the other hand, since a lance locks a terminal in a connector housing, therefore one, which is a plate-shaped projection provided on a terminal itself, is a lance as well. In the terminal lance-type, a lance for locking a terminal is provided on the terminal itself so that the lance of the terminal engages with a locking portion formed in the terminal receiving chamber of the connector housing.

When the terminal is inserted into the terminal receiving chamber 13 of the connector housing 10, the terminal locking lance 15 formed in the terminal receiving chamber 13 shown in FIGS. 6-8 is pressed by a specific provisional locking projection formed on the terminal so as to be bent downward. Thereafter, the projection climbs over the lance 15, thereby the terminal is inserted into the terminal receiving chamber 13 reaching up to a specific position therein.

Then, the terminal locking lance 15 restores its original posture as shown in FIGS. 6-8 by a restoring elastic force of the lance 15. Thus, since the connector housing 10, in which the lance 15 is formed, needs such a bending characteristic, therefore the connector housing 10 is preferably made of synthetic resin having flexibility.

In the following, the engaging portion formed in the connector housing 10 and that formed on the spacer 20 will be explained in terms of their engaging state. As shown in FIGS. 1-8, at the front side of a spacer insertion opening 12 of a circumferential wall 11 of the connector housing 10, a pair of projections 18 for complete locking is formed to engage with a pair of projections 28 for complete locking provided at the front side of an operation portion 26 (see FIGS. 6-8) of the spacer 20.

As shown in FIGS. 5-8, at the front side of the center of a spacer receiving chamber 12 of the connector housing 10, a pair of projections 19 for provisional locking is formed to engage with a pair of projections 29 for provisional locking provided at the front of the lower side of a locking piece 27 of the spacer 20. (Note that the same reference numeral 12 is used for the spacer receiving chamber 12 and spacer insertion opening 12 for convenience.) In order that the pair of projections 19 easily engages with the pair of projections 29 when the spacer 20 is halfway inserted into the spacer receiving chamber 12 so that the spacer 20 is provisionally locked to the connector housing 10, the projection 29 includes a space 29*a* (see FIGS. 6-8) having an inverse U-shape for the projection 29 to bend easily.

In the following, a state in which the spacer 20 is held at the provisional locking position in the connector housing 10 will be explained. As shown in FIG. 8, the projection 29 is situated lower than the projection 19 and situated in the depth of the spacer receiving chamber 12 of the connector housing 10.

However, as shown in FIGS. 1C, 4, 5C and 8, the projection 28 for complete locking does not yet engage with the projection 18 for complete locking. Thus, in the provisional locking state, the spacer 20 has such a positional relationship as described above with the connector housing 10.

Since the connector housing 10 and the spacer 20 are securely mounted to each other in such a provisional locking state as described above, the spacer 20 is prevented from accidentally being parted from the connector housing 10 when the connector housing 10 in which the spacer 20 is mounted is handled in the assembly process.

As shown in FIGS. 1A, 1B, 2, 3, 5A and 6, when the spacer 20 is completely inserted in the spacer receiving chamber 12 of the connector housing 10, the projection 28 for complete locking climbs over the projection 18 for complete locking, thereby the projection 28 engages with the projection 18. Thus, in the complete locking state, the spacer 20 has such a positional relationship as described above with the connector housing 10.

As for the connector, in which the spacer 20 and the female terminal 30 are mounted into the connector housing 10, as shown in FIG. 3, a pair of depressions 12*a* for releasing the complete locking, which engages with a jig, is formed at the rear side of the spacer insertion opening 12, so that the spacer 20 completely locked in the connector housing 10 can be easily released therefrom by providing the jig to the operation portion of the spacer 20 when the spacer 20, which has been completely locked in the connector housing 10, restores its provisional locking state.

As shown in FIGS. 1-8, since the connector housing 10 or the spacer 20 has a complex shape, each of them is preferably made of material which adapts to the mass production, such as synthetic resin that adapts to an injection molding process and has a thermoplastic property.

As shown in FIGS. 6-8, the projection 29 includes the space 29*a* having an inverse U-shape for the projection 29 to bend easily. Therefore, since the spacer 20 needs a bending characteristic, the spacer 20 is preferably made of synthetic resin having flexibility.

As shown in FIGS. 5B and 7, in order that the engagement between the projections 18 and 28 is carried out easily, the connector housing 10 and the spacer 20 are preferably made of synthetic resin having flexibility.

The synthetic resin as described above, which adapts to an injection molding process and has thermoplastic property and flexibility, may be polybutylene terephthalate resin (PBT), acrylonitrile butadiene styrene resin (ABS), polyamide resin (PA), and polypropylen resin (PP). A various type of filler may be added to the synthetic resin as the need arises.

The connector housing 10 and the spacer 20 used in a preferred embodiment of the present invention are made of polybutylene terephthalate resin (PBT) and is excellent in terms of dimensional stability, mechanical strength stability, and stable electric performance. For example, PBT-H01 can be used as the polybutylene terephthalate resin (PBT).

The process or device for assembling the connector 1 according to the present invention relates to a double locking connector 1, in which the spacer 20 and terminal 30 is mounted in the connector housing. No matter whether the spacer 20 is situated at provisional or complete locking position in the connector housing 10, only by inserting a jig rod 50 into the terminal receiving chamber 13 of the connector housing 10, the spacer 20 is securely made be situated at the provisional locking position in the connector housing 10. Therefore, the terminal 30 is smoothly securely fixed in the terminal receiving chamber 13 of the connector housing 10, thereby the connector 10 is assembled.

In more detail, the process or device for assembling the connector 1 according to the present invention relates to the connector housing 10 including the spacer 20 having a provisional locking member and a complete locking member, and primarily the spacer 20 is provisionally locked to the connector housing 10, however in the event that the spacer accidentally moves from the provisional locking position to the complete locking position, in order to make the spacer 20 restore its provisional locking state (i.e. provisional locking position) in the connector housing 10, the jig rod 50 for releasing the complete locking of the spacer 20 in the connector housing is inserted into the terminal receiving chamber 13 of the connector housing 10. Then, the jig rod 50 comes in slidable contact with an inclined wall 22*a* of the spacer 20, the spacer 20 is released from its complete locking state and simultaneously moved toward the direction of coming off, thereby the spacer 20 restores the provisional locking state from the complete locking state.

The spacer used in the present invention may be a side spacer, which is inserted into the connector housing 10 from one direction out of the width directions right and left of the connector housing 10, besides the spacer 20 shown in the figures. As shown in FIGS. 5-8, the jig rod 50 is movable together with its base 55.

The jig rod 50 advances from a specific starting position thereof and is inserted from a rear opening 13*d* of the terminal receiving chamber 13 so as to return the spacer 20, which has been completely locked in the connector housing 10, to the provisional locking position. Thereafter, the jig rod 50 moves back so as to return to the specific starting position.

As described above, since the jig rod 50 is subjected to the repeated moving forward and backward, the jig rod 50 preferably has wear-resistant property and dimensional stability. In order to improve such properties of the jig rod 50 for a long period of time, the jig rod 50 is preferably made of steel containing carbon such as carbon steel and carbon tool steel and is subjected to hardening process and polishing process.

The jig rod 50 may be subjected to plating process for improving the wear-resistant property and dimensional stability thereof. Any kind of jig rod 50 may be used provided that the jig rod 50 can smoothly return the spacer 20, which has been completely locked in the connector housing 10, to the provisional state of the spacer 20 in the connector housing 10 for a long period of time.

The material, hardening, polishing and plating for the jig rod 50 as described above may also be applied to the base 55, connector housing base 60 on which the connector housing 10 is placed, first chuck 70 which holds the connector housing 10 so as to move it from a specific position to another specific position, second chuck 80 which holds the terminal 30 so as to insert it into the connector housing 10, in which the spacer 20 is provisionally mounted (i.e. provisionally locked), and other jig 90 that presses the spacer 20, which is provisionally locked in the connector housing 10 in which the terminal 30 is inserted, so as to set the spacer 20 in the complete locking state (see FIG. 1).

As shown in FIG. 9, a specific jig 50 is made so that the dimension thereof satisfies $Y \geqq 0$ relatively to the spacer 20 that is in its complete locking state. When the jig 50 is inserted from a rear opening 13*d* of the terminal receiving chamber 13 and further inserted into the terminal receiving chamber 13, an inclined guide surface 53 of a gently inclined curved surface provided at an end of the jig 50 easily securely returns the spacer 20 to the provisional locking position from the complete locking position even if the spacer 20 is accidentally locked completely in the connector housing 10.

That is, before the female terminal 30 is inserted into the terminal receiving chamber 13 of the connector housing 10 in which the spacer 20 has been mounted, the jig 50 is inserted into the terminal receiving chamber 13 from the rear opening 13*d* of the terminal receiving chamber 13, thereby the spacer 20 is returned to the provisional locking position from the complete locking position.

In the following, an operation to carry out the process described above will be materially explained. As shown in FIGS. 1-3, in an automatic machine for manufacturing a wiring harness, after the connector housing 10 including the spacer 20 therein is held by a first chuck 70 and placed on a portion 61 recessed on a connector housing base 60, the jig 50 is inserted into the terminal receiving chamber 13 so that the jig 50 comes in slidable contact with an inclined wall 22*a* of the spacer 20 so as to push the inclined wall 22*a* upward as shown in FIGS. 5-8, thereby the spacer 20 is returned to the provisional locking position being released from the complete locking position.

As described above, simply the jig 50 is inserted into the terminal receiving chamber 13 so as to return the spacer 20, which has been completely locked in the connector housing 10, to the provisional locking position again, thereby the workability and productivity are improved.

As shown in FIGS. 1A and 2, the first chuck 70, which holds the connector housing 10 including the spacer 20 therein and moves the connector housing 10 to the portion 61 of the connector housing base 60, consists of a pair of arms. As shown in FIG. 2, each arm has a body 71, protruding piece 72, and nipping member 73 for holding the connector housing 10. The pair of the arms is opened or closed by an actuator 75.

As shown in FIGS. 1C and 4, after the spacer 20 is returned to the provisional locking position in the connector housing 10, the female terminal 30 held by a pair of second chucks 80, each of them being situated at front and rear sides, is inserted into the terminal receiving chamber 13 from the rear opening 13*d* of the connector housing 10. In advance, a wire 40 such as a cable 40 is connected to the rear side of the female terminal 30. Each second chuck 80 is opened or closed by another actuator 85. Each second chuck 80 is movable upward and downward by a cylinder 88 and the like.

As shown in FIGS. 1C and 4, a wire connection part 34 of the female terminal 30 to which the cable 40 is connected is held by one second chuck 80 while the cable 40 situated at the rear of the female terminal 30 is held by another second chuck 80. When the female terminal is inserted into the connector housing 10, the female terminal 30 held by the one second chuck 80 and the cable 40 held by the another second chuck 80 advance together. When the female terminal 30 starts to enter into the connector housing 10, the one second chuck 80 releases the wire connection part 34 of the female terminal 30. Simultaneously, one actuator 85 at the front side mounted to the one second chuck 80 is lifted upward.

Thereafter, the another second chuck 80 at the rear side which holds the cable 40 pushes the female terminal 30 connected to the cable 40 into the interior of the connector housing 10, and thereafter the cylinder 88 lifts up another actuator 85 to which the another second chuck 80 at the rear side is mounted.

All of the steps described above can be automated, therefore the productivity of assembling a connector can be significantly improved.

As shown in FIGS. 1-8, the process for assembling a connector 1 according to the present invention relates to a process, in which the spacer 20 is provisionally locked in the connector housing 10 and thereafter the terminal 30 is completely locked in the connector housing 10. First, the spacer 20 is provisionally locked in the connector housing 10. Otherwise, the connector housing 10 in which the spacer 20 is in advance provisionally locked is prepared. At that time, there may be some connector housings 10 in which the spacer 20 is accidentally completely locked in the connector housing 10.

Thereafter, as shown in FIGS. 1B, 3, and 5-8, the jig rod 50 is inserted into the connector housing 10 before the insertion of the terminal 30. Thereafter, the jig rod 50 is pulled out from the connector housing 10. Thereafter, the terminal 30 is inserted into the connector housing 10 (see FIGS. 1C and 4).

With the operation described above, even if the spacer 20 is accidentally completely locked in the connector housing 10 before the terminal 30 is inserted into the connector housing 10, the spacer 20 can easily quickly restore the provisional locking state again. Thereby, the insertion performance of the terminal 30 into the terminal receiving chamber 13 of the connector housing 10 can be improved.

The spacer 20 is in advance mounted in the connector housing 10 before the insertion of the terminal 30. It has not been secured that the spacer 20 is always provisionally locked in the connector housing 10. However, with the construction according to the present invention, no matter whether the spacer 20 is provisionally or completely mounted in the connector housing 10, the spacer 20 is securely set in the provisional locking state thereof only by inserting the jig rod 50 into the connector housing 10. Therefore, the terminal 30 can be securely fixed in the connector housing 10 without interfering with the spacer 20.

In the following, the process for assembling the connector 1 will be explained in detail. As shown in FIGS. 6-9, the inclined guide surface 53 of a gently inclined curved surface is provided in the vicinity of the end 52 of the jig 50. The jig rod 50 includes a straight portion 51. The jig rod 50 is inserted into the terminal receiving chamber 13 from the rear opening 13*d*. Then, the jig rod 50 is advanced with making the inclined guide surface 53 abut against a rear end 25 of the spacer 20. The inclined guide surface 53 of the jig rod 50 smoothly comes in slidable contact with the inclined wall 22*a* of the spacer 20 and lifts the spacer 20 upward, thereby the spacer 20 is smoothly returned to the provisional locking position being released from the complete locking position in the connector housing 10.

As shown in FIG. 9, an optional portion between the front end 53*a* of the inclined guide surface 53 and the rear end 53*b*, i.e., inflection point 53*b* of the inclined guide surface 53, at which the curved surface ends, abuts against a corner 24, at which the inclined surface 23 of the inclined wall 22*a* and a rear end surface 25*a* of the spacer 20 intersect each other. Thus, the inclined guide surface 53 of the jug rod 50 is provided relatively to the corner 24 at the rear side of the spacer 20, so that an entanglement between the jig rod 50 and spacer 20 is prevented from occurring when a front surface 52*a* of the jig rod 50 abuts against the rear end surface 25*a* of the spacer 20.

Since the inclined guide surface 53 of a gentle curved surface is formed in the vicinity of the end 52 of the jig rod 50, the spacer 20 completely locked in the connector housing 10 is securely released from the complete locking position and the spacer 20 is smoothly moved to the provisional locking position relatively to the connector housing 10.

Since the inclined guide surface 53 of a gentle curved surface is formed in the vicinity of the end 52 of the jig rod 50, as shown in FIGS. 6-8, when the jig rod 50 is inserted into the terminal receiving chamber 13 and the end 52 of the jig rod 50 abuts against the rear end 25 of the spacer 20 so as to push the spacer 20 upward in the connector housing 10, the spacer 20 completely locked in the connector housing 10 is securely released from the complete locking position and the spacer 20 is smoothly moved to the provisional locking position relatively to the connector housing 10 without damaging or deforming the spacer 20 due to the jig rod 50.

As shown in FIGS. 1-4, the device for assembling a connector 1 according to the present invention includes the first chuck 70 for holding the connector housing 10 in which the spacer 20 is mounted so as to move the connector housing 10 to a specific position, the base 60 for placing the connector housing thereon, the jig rod 50 movable up to the interior of the terminal receiving chamber 13 of the connector housing 10 for moving the spacer from the complete locking position to the provisional locking position, and another second chuck 80 for holding the terminal 30 so as to insert the terminal 30 into the terminal receiving chamber 13.

With the construction described above, if the device for assembling a connector 1 according to the present invention is used as an automatic assembly machine, a problem that the terminal 30, spacer 20 or connector housing 10 may be damaged in the event that the terminal 30 is accidentally inserted into the connector housing 10 in which the spacer 20 is completely locked can be prevented from occurring, thereby the deterioration in the yield of the terminal 30, spacer 20 or connector housing 10 can be prevented from occurring.

Above all, when the terminal 30 to which the wire 40 such as the cable 40 and wiring harness is already connected is deformed or damaged, components in connection with the connector 1 together with the other components such as the cable 40 and so on connected to the terminal 30 have to be assembled with each other again from the beginning. To the contrary, with the device for assembling a connector 1 according to the present invention described above, the terminal 30 is not deformed or damaged, thereby the yield of each of the various components is significantly improved. When the device for assembling a connector 1 according to the present invention is used as the automatic assembly machine, a series of the operations described above can be carried out by using such an automatic assembly machine, thereby the productivity for manufacturing a connector 1 can be significantly improved.

As shown in FIGS. 1C and 4, a jig 90 having a flat plate-shape for complete locking is mounted to another cylinder 98. At the end of the assembly process described above, the jig 90 provided in the device for assembling presses the spacer 20, which is provisionally locked in the connector housing 10 by the falling action of the another cylinder 98. Thereby, the terminal 30, which is tentatively locked in the terminal receiving chamber 13 of the connector housing 10 by a locking lance provided in the terminal receiving chamber 13, is fully locked in the terminal receiving chamber 13 by the spacer 20 that is completely locked in the connector housing 10. Thus, the terminal 30 is doubly locked in the connector housing 10 by the spacer 20, thereby the connector 1 is securely assembled.

The aforementioned preferred embodiments are described to aid in understanding the present invention and variations may be made by one skilled in the art without departing from the spirit and scope of the present invention.

What is claimed is:

1. A device for assembling a connector comprising:

a first chuck for holding a connector housing;

a spacer included in said first chuck so that said first chuck moves the connector housing to a specific position;

a base on which the spacer and the connector housing are placed;

a jig rod reachable up to the interior of a terminal receiving chamber of the connector housing, for changing a locking state of the spacer in the connector housing from complete locking to provisional locking; and a second chuck for holding a terminal so as to insert the terminal in the terminal receiving chamber of the connector housing.

2. The device for assembling a connector according to claim 1, wherein an inclined guide surface is formed at an end of the jig rod and the inclined guide surface abuts against a corner, at which an inclined surface and rear end surface of the spacer intersect each other.

* * * * *